United States Patent [19]
Ohashi et al.

[11] Patent Number: 5,597,232
[45] Date of Patent: Jan. 28, 1997

[54] VEHICULAR HEADLAMP HAVING IMPROVED COLLISION SAFETY

[75] Inventors: Hideki Ohashi; Shinji Karasawa, both of Shizuoka, Japan

[73] Assignee: Koito Manufacturing Co., Ltd., Tokyo, Japan

[21] Appl. No.: 496,172

[22] Filed: Jun. 28, 1995

[30] Foreign Application Priority Data

Jun. 28, 1994 [JP] Japan .................................. 6-167516

[51] Int. Cl.⁶ .................................................. F21V 15/00
[52] U.S. Cl. ........................... 362/265; 362/61; 362/369; 362/376; 362/390
[58] Field of Search .............................. 362/265, 61, 80, 362/390, 369, 376, 378

[56] References Cited

U.S. PATENT DOCUMENTS

| 5,113,330 | 5/1992 | Makita | 362/265 |
| 5,118,990 | 6/1992 | Makita | 315/77 |
| 5,119,275 | 6/1992 | Makita | 362/61 |
| 5,140,504 | 8/1992 | Sato | 362/61 |
| 5,188,444 | 2/1993 | Makita et al. | 362/80 |
| 5,228,776 | 7/1993 | Smith et al. | 374/5 |
| 5,434,763 | 7/1995 | Hege et al. | 362/61 |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

A reflector, a metal halide lamp and a container casing containing a lighting circuit board for the metal halide lamp are mounted within a lamp housing. The container casing, having a generally rectangular parallelepiped shape, is mounted on the lamp housing through a bracket extending along the rear surface of the reflector in tilted relation to a vertical axis. If an impact is applied to the front side of a headlamp, the container casing rises, thereby protecting the container casing from breakage because of a cushioning effect obtained when the container casing partially deforms the reflector.

9 Claims, 3 Drawing Sheets

VEHICULAR HEADLAMP HAVING IMPROVED COLLISION SAFETY

BACKGROUND OF THE INVENTION

The present invention relates to a vehicular headlamp in which a reflector, an electric discharge lamp and a casing containing a lighting circuit board for the electric discharge lamp are mounted within a lamp housing, in which, in the event the container casing is damaged such as in a collision, secondary problems such as fire and electric shock are prevented.

Recently, small-size metal halide lamps have been used as a light source for a vehicular headlamp, instead of the conventional halogen lamps.

FIG. 3 shows an example of a headlamp a employing a metal halide lamp in which a front opening of a reflector c mounted in a lamp housing b is covered by a lens d. The light-emitting portion f of the metal halide lamp e is inserted into a chamber defined by the reflector c and the lens d through an insertion hole g formed through the reflector c. A headlamp unit h is constituted by the reflector c, the lens d and the metal halide lamp e.

A lighting circuit board for the metal halide lamp e is contained in a container casing i. The container casing i, which has a generally rectangular parallelepiped shape, is mounted within the lamp housing b, disposed in a recumbent posture below the reflector c. An activating circuit for producing activating pulses of high voltage for starting the metal halide lamp e and a lighting control circuit are included in the lighting circuit.

In the above lamp, however, if the container casing i is damaged by an impact produced in the event of a collision or the like, there arises a problem that fire, electric shock or the like may occur.

More specifically, when an external force is applied to the lamp in the direction of an arrow A (FIG. 3) in the event of a collision or the like, the container casing i can be crushed between the car body j and a collision object, as shown by a broken line, so that the lighting circuit within the container casing i is damaged, while the high voltage activating pulses continue to be produced. This is very dangerous.

SUMMARY OF THE INVENTION

In order to overcome the above problem, it is an object of the invention to provide a vehicular headlamp in which a reflector, an electric discharge lamp and a container casing containing a lighting circuit board for the electric discharge lamp are mounted within a lamp housing. The container casing has a generally rectangular parallelepiped shape and is mounted on the lamp housing extending along the rear surface of the reflector. That is, the container casing is mounted so that a major surface thereof faces the adjacent rear surface of the reflector. For this purpose, the container casing is generally mounted in a tilted position, i.e., at an oblique angle relative to horizontal.

In accordance with the present invention, if an impact is applied to the container casing from the front side thereof as in a front-end collision, the tilted container casing rises. As a result, the container casing is protected from breakage because of a cushioning effect obtained when the container casing partially deforms the reflector. Therefore, secondary problems such as a fire and electric shock can be prevented.

DESCRIPTION OF THE PREFERRED EMBODIMENTS

Figure 1:
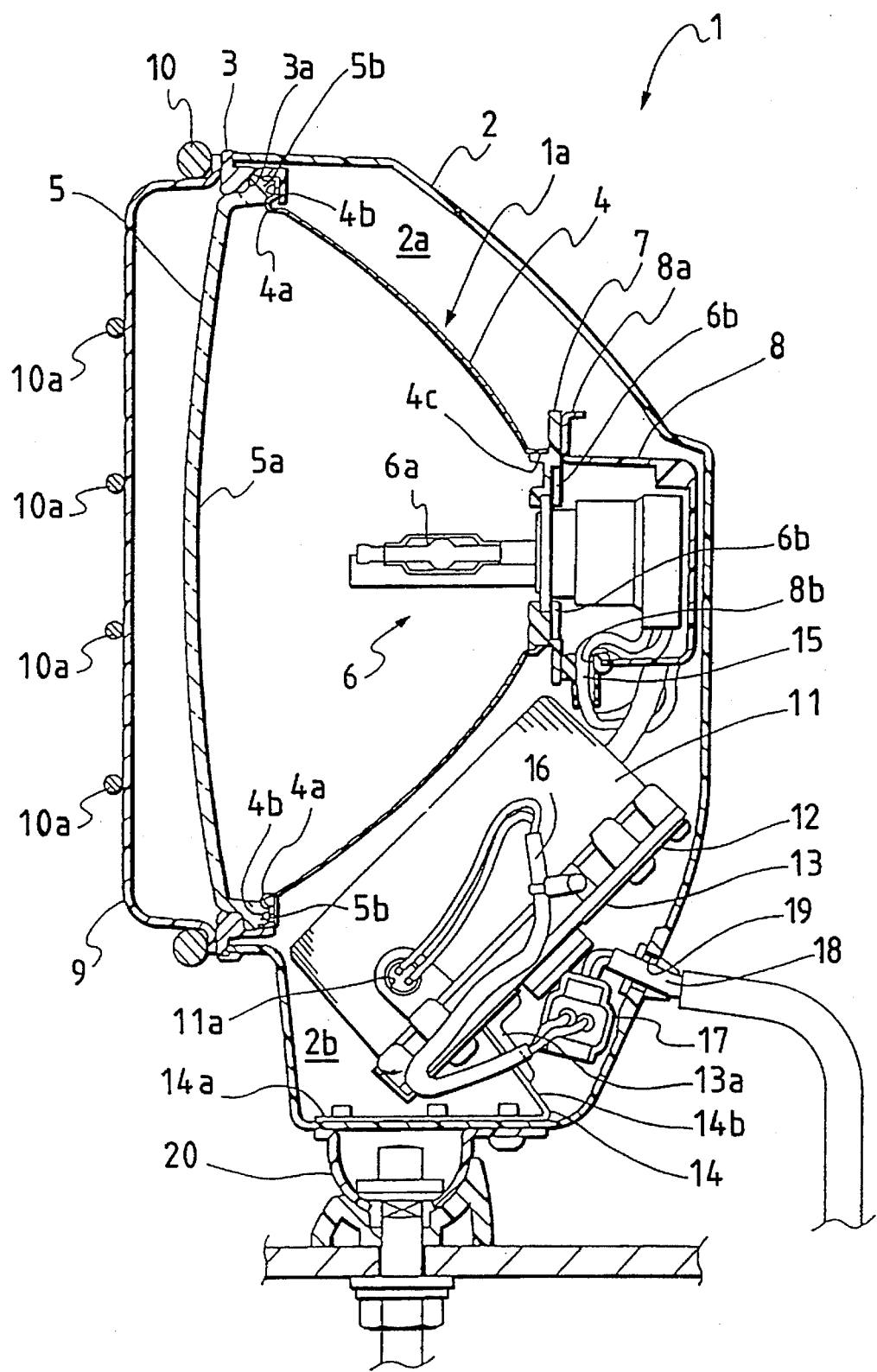
FIG. 1 is a vertical cross-sectional view of a vehicular headlamp constructed according to the present invention.

Preferred embodiments of a vehicular headlamp constructed in accordance with the invention now will be described.

In the following description, the invention is applied to an automotive headlamp having a stone guard.

In the headlamp 1, a headlamp unit 1a is mounted within a lamp housing 2 made of a synthetic resin. The internal space of the lamp housing 2 includes a receiving space 2a receiving the headlamp unit 1a, and a receiving space 2b below the receiving space 2a in which a container casing is mounted in a tilted manner. A ring-shaped rim 3 is fitted around the front opening of the lamp housing 2. The rim 3 is made of a synthetic resin. A fitting groove 3a is formed in the inner peripheral surface of the rim 3.

The headlamp unit 1a includes a reflector 4, a lens 5 mounted on the reflector 4 covering the front opening of the reflector 4, and a metal halide lamp 6 having a light-emitting portion disposed in a space formed by the reflector 4 and the lens 5. The reflector 4 is made of a metal material.

The lens 5 is mounted on the reflector 4 covering the front opening thereof. A lens mounting portion 4a is formed on the outer edge of the reflector 4, which lens mounting portion 4a has a mounting groove 4b directed forward. A peripheral wall portion 5b projects rearward from the edge of a lens portion 5a of the lens 5, and is fitted in the mounting groove 4b. The mounting portion 4a of the reflector 4 and the rear end of the peripheral wall portion 5b of the lens 5 are fitted in the fitting groove 3a in the rim 3. The reflector 4 is fixedly secured to the lamp housing 2 by a mounting member (not shown).

The light-emitting portion 6a of the metal halide lamp 6 is inserted into the space defined by the lens 5 and the reflector 4 through an insertion hole 4c formed in the reflector 4.

A mounting holder 7 for the metal halide lamp 6 is fitted at its front portion in the insertion hole 4c in the reflector 4. The metal halide lamp 6 is fixedly secured to the mounting holder 7 by screws in such a manner that flanges 6b formed on the base of the lamp 6 are mated with a rear end surface of the mounting holder 7.

A cover 8 made of a synthetic resin covers the base of the metal halide lamp 6. A mounting portion 8a is formed at the front end of the cover 8, and is secured to the rear surface of the mounting holder 7. A wiring hole 8b is formed through a lower wall portion of the cover 8.

A lamp cover 9 made of a synthetic resin covers the front opening of the lamp housing 2, and is held against the rim 3 by the stone guard 10.

The stone guard 10, which is provided to protect the lens 5 against impact from stones or the like, has a plurality of parallel guard portions 10a extending horizontally at predetermined intervals. Although not shown in the drawings, the stone guard 10 is supported at one of right and left ends thereof on the lamp housing 2 so as to be pivotally opened laterally. A clamper, provided at the other end of the stone guard 10, is engaged with a retaining portion, thereby holding the stone guard on the lamp housing 2. To remove the lamp cover 9, the clamper is disengaged from the retaining portion, and then the stone guard 10 is opened laterally.

The container casing 11 is received in the receiving space 2b in the lamp housing 2, and is mounted obliquely rearward of the reflector 4 in a tilted manner such that one longitudinal side face of the container casing 11 extends along the rear surface of the lower half portion of the reflector 4. Wiring holes 11a (only one of which is shown in FIG. 1) are formed through a side wall of the container casing 11.

The container casing 11, which is made of a synthetic resin and which has a generally rectangular parallelepiped shape, contains a lighting circuit board for operating the metal halide lamp 6. The lighting circuit includes an activating circuit for supplying activating pulses of high voltage for starting the metal halide lamp 6, a lighting control circuit for controlling the flow of electric power to the lamp, and various protective circuits for detecting abnormal conditions of the lamp so as to operate it safely.

The container casing 11 is mounted on the lamp housing 2 by a bracket 12. The bracket 12, which is made of a metal material, includes a support plate 13 for mounting the container case 11 and a mounting plate 14 fixedly secured to the support plate 13. The flat support plate 13 slants downward forwardly, and the container casing 11 is fixedly secured to the support plate 13 by screws. The mounting plate 14 has a horizontally disposed flat plate portion 14a, and a support portion 14b extending obliquely upward from the rear end of the flat plate portion 14a. The upper end portion of the support portion 14b is fixedly secured to the support plate 13 through an L-shaped connecting member 13a, and the flat plate portion 14a is fixedly secured to the inner surface of a bottom wall of the lamp housing 2 by screws.

Cords 15 and 16 extending from the container casing 11 pass through respective wiring holes 11a formed in the casing 11. The cord 15 passes through the wiring hole 8b, and is connected to the base of the metal halide lamp 6. The cord 16 is connected to a connector 17. A cord 18 extends from the connector 17 to the exterior of the lamp housing 2 through a hole 19 formed through the lower portion of the rear wall of the lamp housing 2. The cord 18 is connected to a power circuit portion (not shown). A lamp mounting member 20 is used to mount the headlamp 1 on the body of the vehicle. The lamp mounting member 20 is fixedly secured to the bottom of the lamp housing 2 by screws.

Figure 2A:
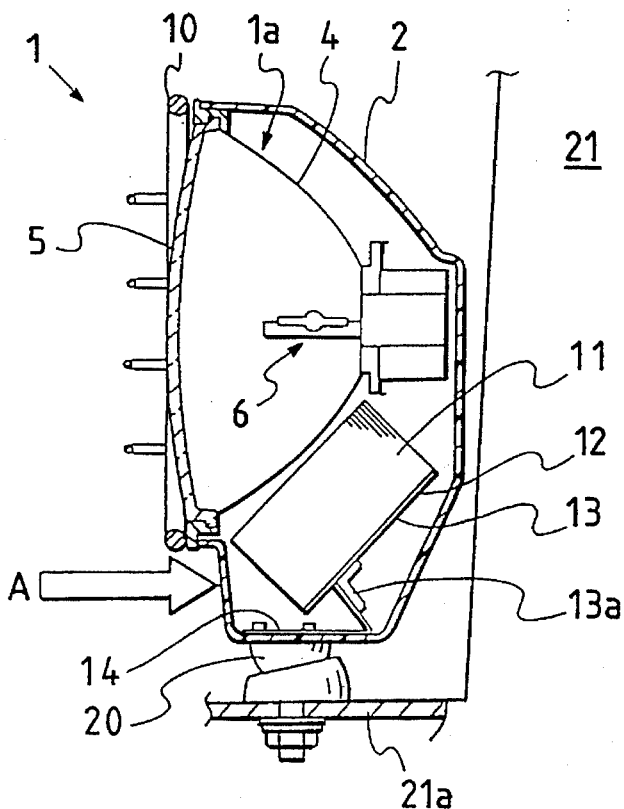
FIG. 2(a) is a view schematically showing a condition of a container casing before a collision.
Figure 2B:
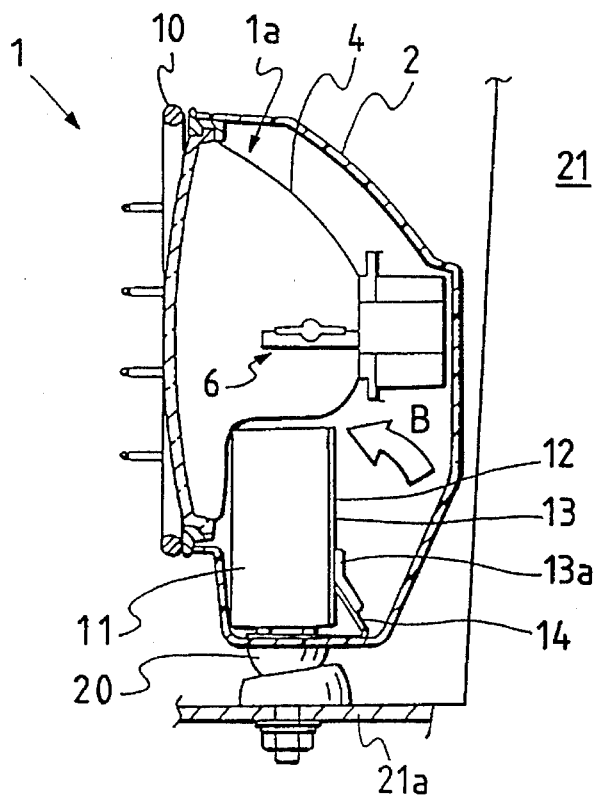
FIG. 2(b) is a view schematically showing a condition of the container casing at the time of a collision.
Figure 3:
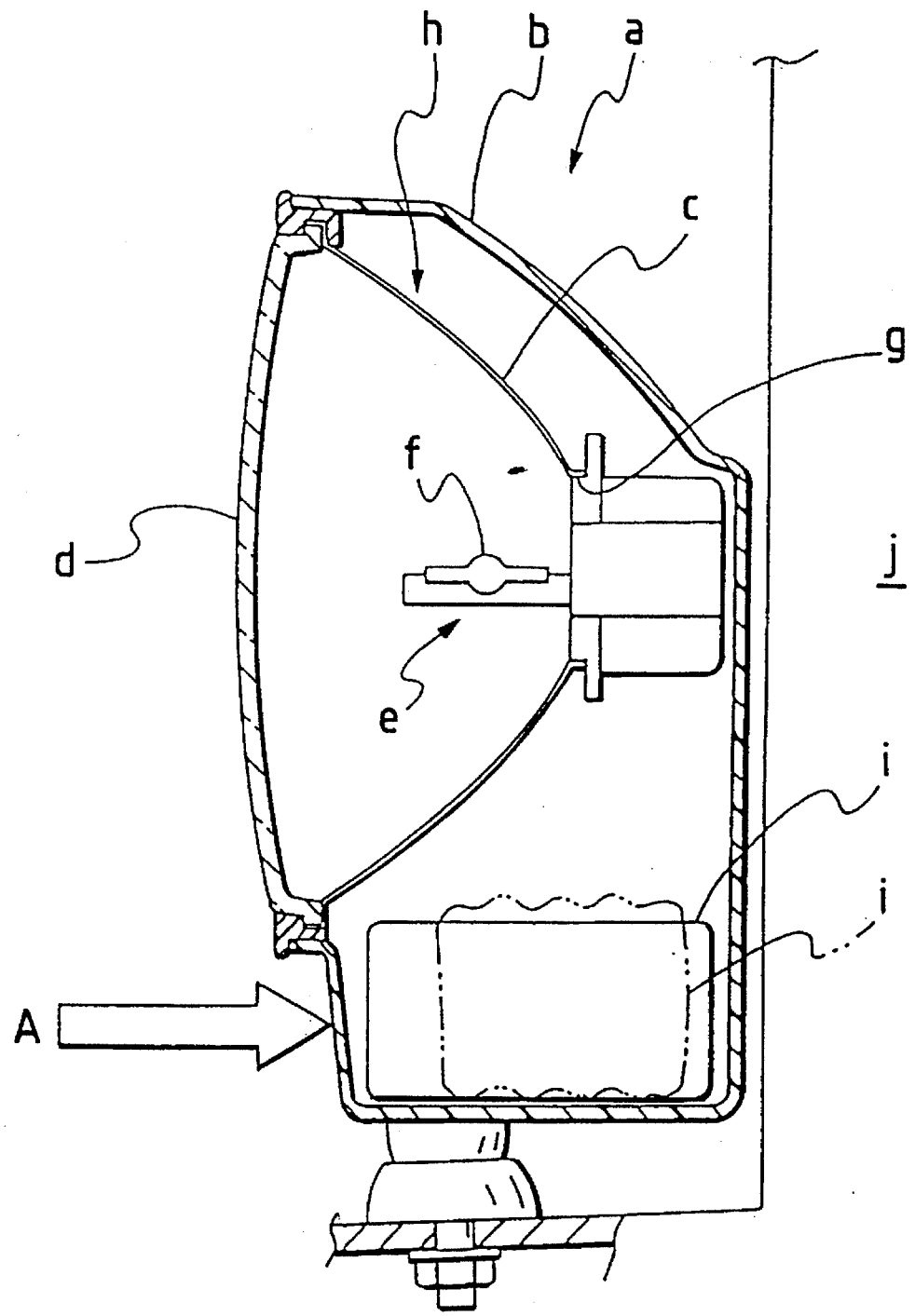
FIG. 3 is a schematic view of a conventional vehicle headlamp showing the construction thereof and illustrating a problem with the conventional headlamp.

FIGS. 2(a) and 2(b) show a change in the condition of the container casing 11 when an impact is applied to the front side of the headlamp 1, as may occur in the case of a collision. Reference numeral 21 denotes the body of the vehicle. In this case, the headlamp 1 is mounted on a bumper 21a.

As shown in FIG. 2(a), when an external force is applied to the headlamp 1 in the direction of an arrow A, the tilted container casing 11 rises due to a reaction force, as indicated by an arrow B in FIG. 2(b). At this time, the support plate 13 of the bracket 12 rises together with the container casing 11 since the connecting member 13a, connecting the support plate 13 and the mounting plate 14 is made of an elastic material. As a result, the lower half portion of the reflector 4 is partially crushed by the container casing 11. Because of this cushioning effect, the impact force applied to the container casing 11 is absorbed.

That is, when the headlamp 1 is crushed between the collision object and the body 21, there is a high probability that the container casing 11 will be protected from a strong impact because of its tilted posture and the cushioning effect of the reflector 4. The bracket 12 supporting the container casing 11 assists in raising the container casing 11 in the event of a collision, and prevents the container casing 11 from being disengaged from the lamp housing 2 if the lamp housing 2 is broken. Also, the bracket 12 provides a vibration dampening effect during ordinary operation.

In the headlamp 1 described above, the reflector 4 is not harder than the container casing 11 in order to make sure that the container casing 11 receives the cushioning effect.

As described above, when an impact is applied to the container casing from the front side thereof as in a front-end collision, the tilted container casing rises to partially crush the reflector. Because of the cushioning effect produced at this time, the impact on the container casing is reduced, thereby protecting the container casing from damage or breakage. Therefore, a secondary problem such as a fire due to high voltage supplied to the electric discharge lamp can be prevented.

Further according to the invention, the container casing is mounted on the lamp housing through a fixing member so that the container casing can rise upon application of an impact on the container casing from the front side thereof. Therefore, there is less of a chance that the container casing will be left in a dangerous position upon application of an impact, and also the container casing is prevented from being disengaged from the lamp housing if the lamp housing is broken. Further, the vibration dampening property of the container casing is enhanced.

What is claimed is:

1. A vehicular headlamp comprising:

a lamp housing;

a reflector having a frontward-facing, light reflecting surface and an opposite rearward facing surface;

an electric discharge lamp disposed on the frontward facing side of said reflector; and a container casing containing a lighting circuit board for operating said electric discharge lamp, said reflector, electric discharge lamp and container casing being mounted within said lamp housing, said container casing having a generally rectangular parallelepiped shape, and a fixing member for elastically mounting said casing on said lamp housing in a position adjacent said rearward-facing surface of said reflector, said fixing member being operative to move said casing in a predetermined direction upon application of a force from said frontward facing direction.

2. The vehicular headlamp according to claim 1, wherein said container casing is mounted at an oblique angle relative to horizontal.

3. The vehicular headlamp according to claim 1, wherein said fixing member is operative to mount said container casing on said lamp housing in such a manner that said container casing can rise upon application of an impact to said headlamp from a front side thereof.

4. The vehicular headlamp according to claim 3, wherein said fixing member comprises a bracket made of a metal material.

5. The vehicular headlamp according to claim 4, wherein said bracket comprises a support plate for mounting said container case and a mounting plate fixedly secured to said support plate.

6. The vehicular headlamp according to claim 5, wherein said support plate slants downward and forward, said container casing being fixedly secured to said support plate.

7. The vehicular headlamp according to claim 6, wherein said mounting plate has a horizontally disposed flat plate portion and a support position, and further comprising an L-shaped connecting member, said support portion extending obliquely upward from a rear end of said flat plate portion, an upper end portion of said support portion being fixedly secured to said support plate through said L-shaped connecting member, and said flat plate portion being fixedly secured to an inner surface of a bottom wall of said lamp housing.

8. The vehicular headlamp according to claim 7, wherein said L-shaped connecting member is made of an elastic material.

9. The vehicular headlamp according to claim 1, wherein said container casing is harder than said rear surface of said reflector.

* * * * *